(12) United States Patent
Kitamaki et al.

(10) Patent No.: US 10,999,558 B2
(45) Date of Patent: May 4, 2021

(54) MONITORING SYSTEM

(71) Applicant: Daifuku Co., Ltd., Osaka (JP)

(72) Inventors: Hiroyuki Kitamaki, Hinocho (JP);
Keishi Ooishi, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 16/644,611

(22) PCT Filed: Sep. 3, 2018

(86) PCT No.: PCT/JP2018/032564
§ 371 (c)(1),
(2) Date: Mar. 5, 2020

(87) PCT Pub. No.: WO2019/065097
PCT Pub. Date: Apr. 4, 2019

(65) Prior Publication Data
US 2020/0288086 A1    Sep. 10, 2020

(30) Foreign Application Priority Data
Sep. 27, 2017   (JP) .............................. JP2017-186658

(51) Int. Cl.
*H04N 7/18*    (2006.01)
*H04N 5/77*    (2006.01)
*B65G 1/137*   (2006.01)

(52) U.S. Cl.
CPC .............. *H04N 7/181* (2013.01); *H04N 5/77* (2013.01); *B65G 1/137* (2013.01)

(58) Field of Classification Search
CPC . H04N 5/77; H04N 7/181; H04N 9/79; B65G 1/137; B65G 43/00
(Continued)

(56) References Cited

U.S. PATENT DOCUMENTS

2002/0075288 A1    6/2002   Matsumura et al.
2009/0244281 A1   10/2009   Hiromasa
(Continued)

FOREIGN PATENT DOCUMENTS

EP    2949510       *   2/2015
EP    2949540 A1      12/2015
(Continued)

*Primary Examiner* — Robert Chevalier
(74) *Attorney, Agent, or Firm* — The Webb Law Firm

(57) ABSTRACT

A control device for controlling a display device, when an abnormality has occurred in any of a plurality of monitoring target devices, executes a first display control that causes the display device to display abnormality occurrence information including at least identification information of the monitoring target device in which the abnormality has occurred and occurrence time information indicating the time when the abnormality occurred, and when one item, or one item among two or more items, of the abnormality occurrence information displayed in the display device has been selected, executes a second display control that acquires image capturing information of the monitoring target device corresponding to the selected abnormality occurrence information from a storage device and causes the display device to display the acquired image capturing information, and executes a third display control that acquires operation information of the monitoring target device corresponding to the selected abnormality occurrence information from the storage device and causes the display device to display the acquired operation information.

10 Claims, 9 Drawing Sheets

(58) Field of Classification Search
USPC ........ 348/159, 143, 151, 153; 386/226, 229, 386/277
See application file for complete search history.

(56) References Cited

U.S. PATENT DOCUMENTS

| | | |
|---|---|---|
| 2013/0207811 A1 | 8/2013 | Yagawa |
| 2014/0229001 A1 | 8/2014 | Tsujita |
| 2016/0372157 A1 | 12/2016 | Funagi |
| 2018/0103241 A1* | 4/2018 | Waniguchi ....... G08B 13/19693 |
| 2019/0360177 A1* | 11/2019 | Kiyota .................... G06T 11/00 |
| 2020/0404222 A1* | 12/2020 | Hirasawa ............... H04N 7/181 |

FOREIGN PATENT DOCUMENTS

| | | |
|---|---|---|
| JP | 2004104572 A | 4/2004 |
| JP | 201352958 A | 3/2013 |
| JP | 201352994 A | 3/2013 |
| JP | 201618571 A | 2/2016 |
| JP | 2016100672 A | 5/2016 |

\* cited by examiner

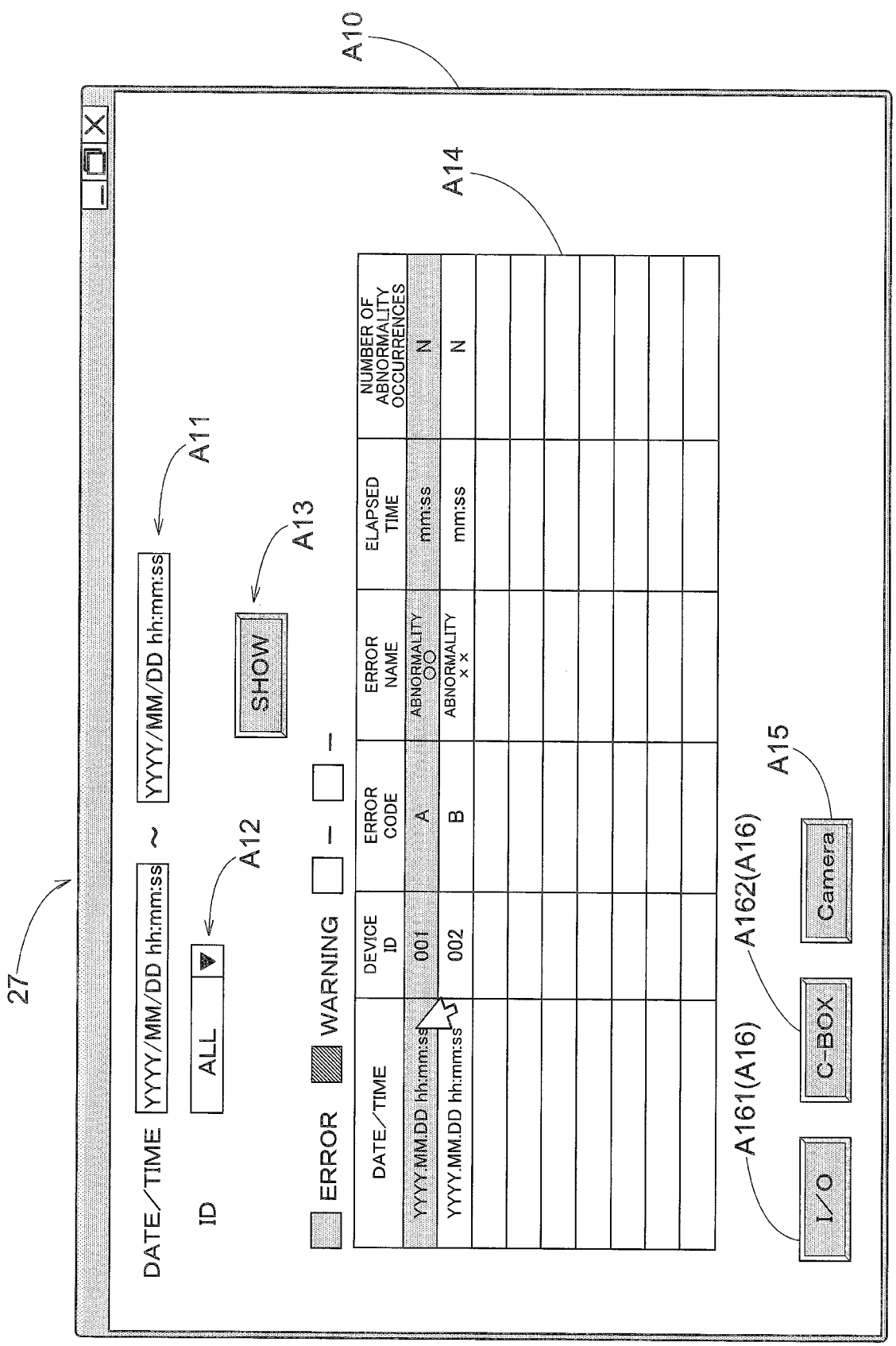

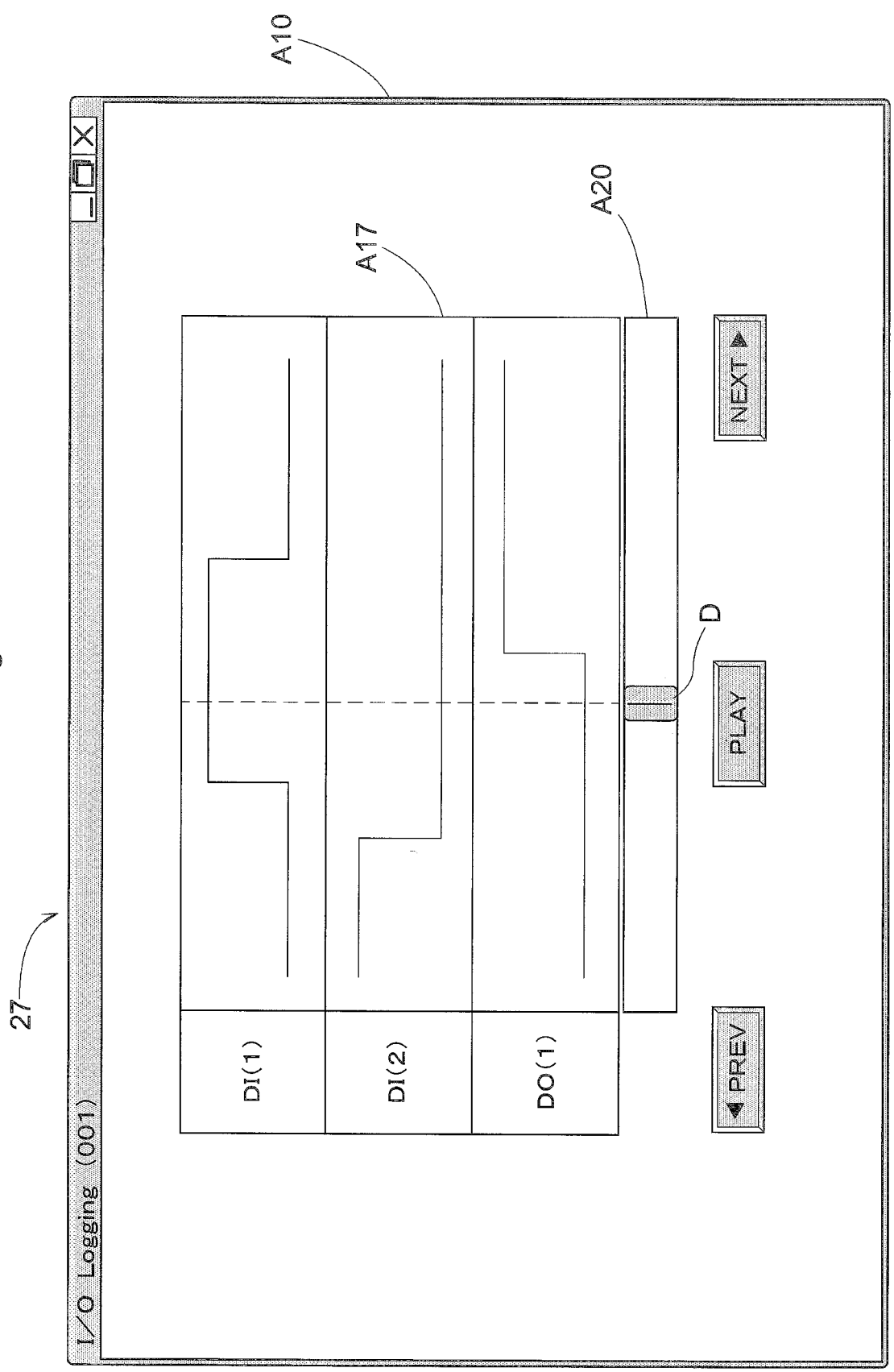

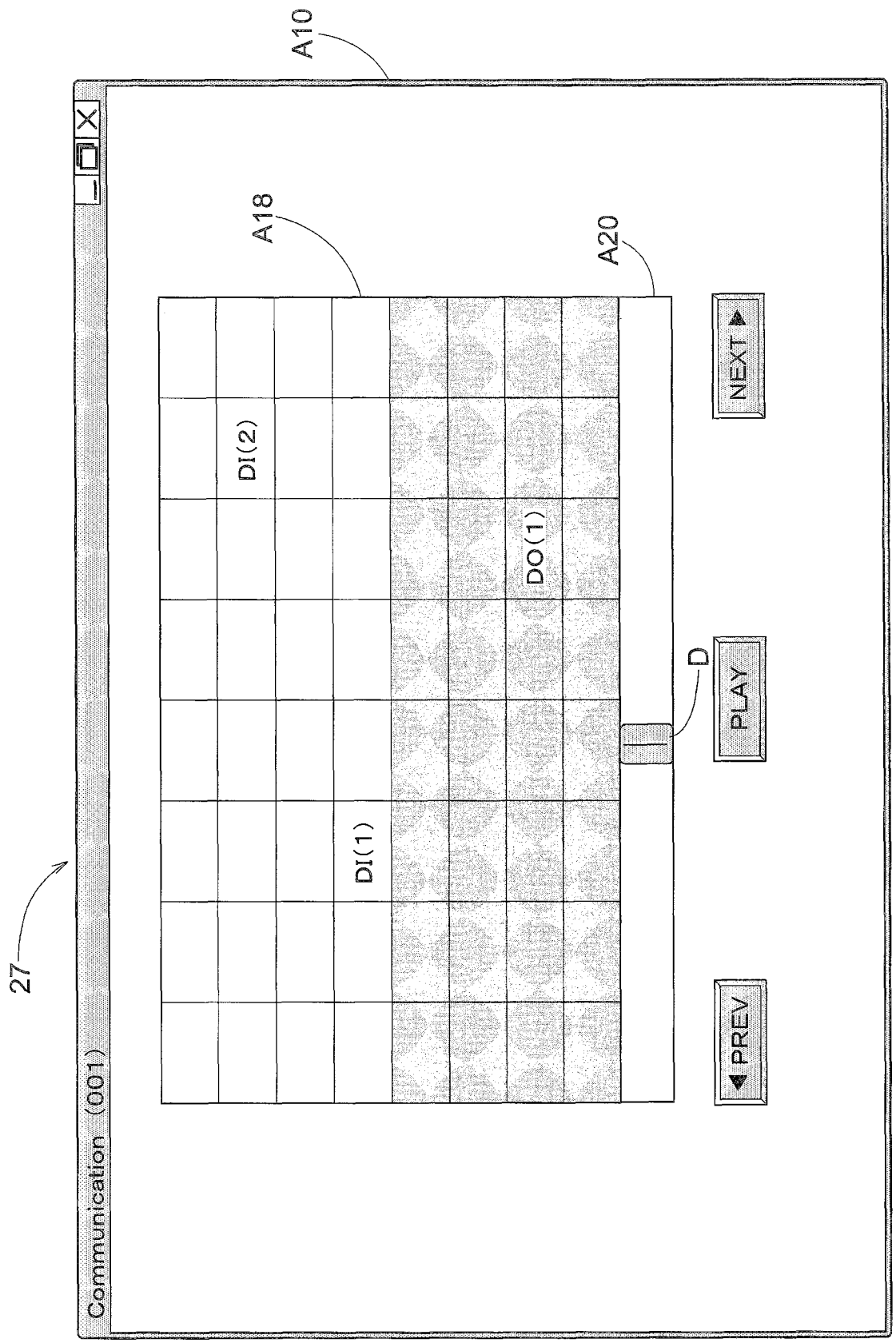

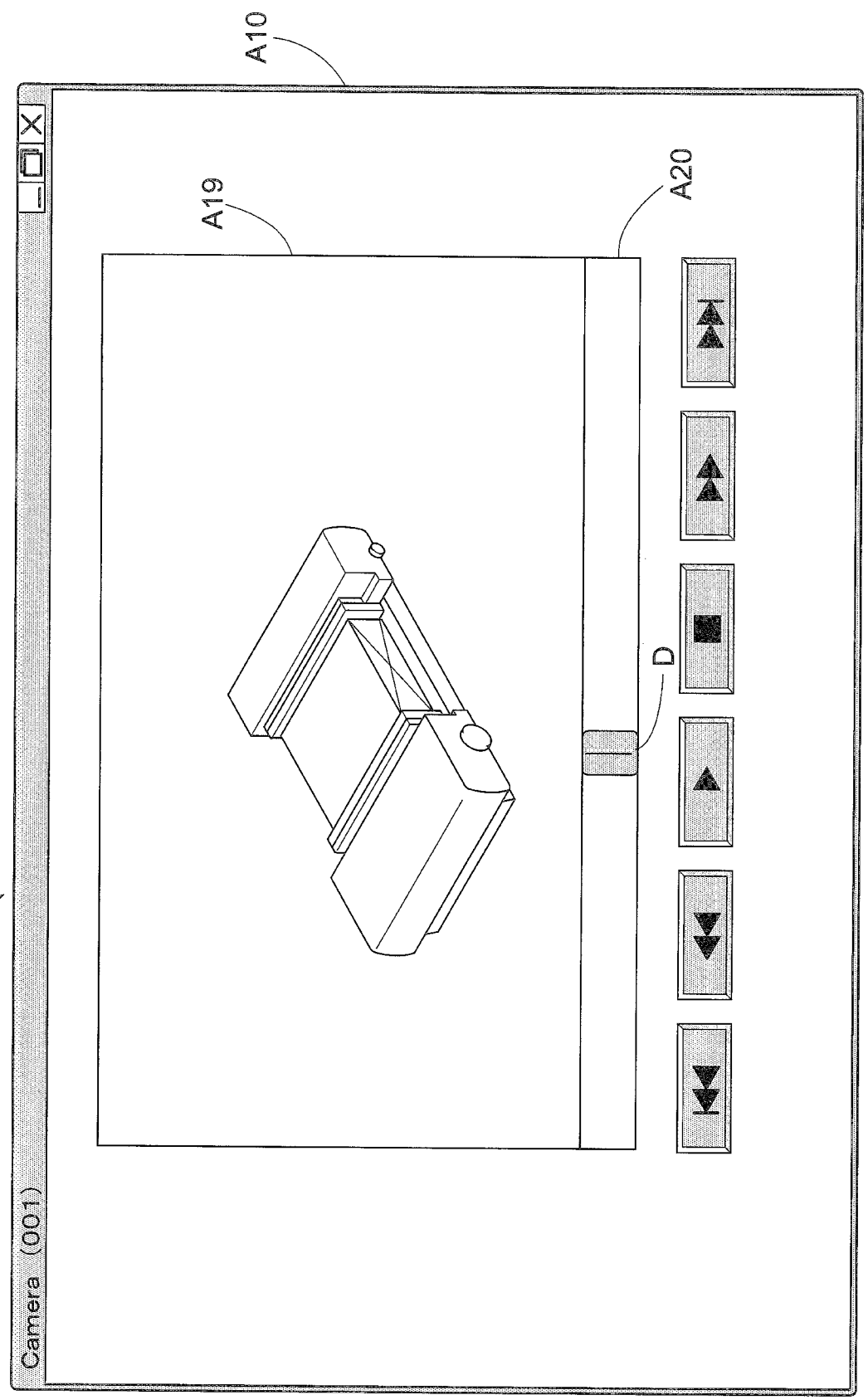

MONITORING SYSTEM

CROSS-REFERENCE TO RELATED APPLICATIONS

This application is the United States national phase of International Application No. PCT/JP2018/032564 filed Sep. 3, 2018, and claims priority to Japanese Patent Application No. 2017-186658 filed Sep. 27, 2017, the disclosures of which are hereby incorporated by reference in their entirety.

BACKGROUND OF THE INVENTION

Field of the Invention

The present invention relates to a monitoring system that monitors a plurality of monitoring target devices.

Description of Related Art

An example of the above sort of monitoring system is described in JP 2013-052994A (Patent Document 1). The monitoring system in Patent Document 1 is provided with a display device (a monitor 13) that displays operation information of a plurality of monitoring target devices, and a control device (a computer 12) that controls the display device. When an abnormality has occurred in the plurality of monitoring target devices, the control device executes a control that causes the display device to display identification information indicating the monitoring target device in which the abnormality has occurred, and text information indicating the content of the abnormality in the monitoring target device.

SUMMARY OF THE INVENTION

In the monitoring system described above, it is possible to judge which monitoring target device among the plurality of monitoring target devices has an abnormality from the identification information of the monitoring target device displayed in the display device, and it is possible to judge what sort of abnormality has occurred in the monitoring target device from the text information displayed in the display device, but it is not possible to confirm the state of the monitoring target device when the abnormality occurred. Therefore, it has been difficult to later confirm under what circumstances and how the abnormality occurred in the monitoring target device.

Consequently, it is desired to realize a monitoring system in which it is easy to confirm under what circumstances and how an abnormality has occurred in a monitoring target device.

In view of the above circumstances, in a characteristic configuration, a monitoring system includes a plurality of image capturing devices that capture images of a plurality of monitoring target devices, output devices that output operation information of the plurality of monitoring target devices, a display device that displays information, a control device that controls the display device, and a storage device that stores information. The storage device stores, in an associated manner, image capturing information obtained in image capturing of each of the plurality of image capturing devices, image capturing time information indicating the time when the image capturing information was captured, and identification information of the monitoring target devices for which the image capturing information was captured, and the storage device also stores, in an associated manner, the operation information output by each of the plurality of output devices, operation time information indicating the time when the operation information was obtained, and identification information of the monitoring target devices related to the operation information. The control device, when an abnormality has occurred in any of the plurality of monitoring target devices, executes a first display control that causes the display device to display abnormality occurrence information including at least identification information of the monitoring target device in which the abnormality has occurred and occurrence time information indicating the time when the abnormality occurred; and the control device, when one item, or one item among two or more items, of the abnormality occurrence information displayed in the display device has been selected, executes a second display control that acquires the image capturing information of the monitoring target device corresponding to the selected abnormality occurrence information from the storage device and causes the display device to display the acquired image capturing information, and executes a third display control that acquires the operation information of the monitoring target device corresponding to the selected abnormality occurrence information from the storage device and causes the display device to display the acquired operation information.

According to this configuration, when an abnormality has occurred in a monitoring target device, the control device executes the first display control and thus the abnormality occurrence information for the monitoring target device in which the abnormality occurred is displayed in the display device. Thus, it is possible to confirm afterward that the abnormality occurred in the monitoring target device. Also, when an operation has been performed to select one item, or one item among two or more items, of the abnormality occurrence information displayed in the display device, the control device executes the second display control and thus displays the image capturing information of the monitoring target device corresponding to the selected abnormality occurrence information in the display device. Also, when an operation has been performed to select one item, or one item among two or more items, of the abnormality occurrence information displayed in the display device, the control device executes the third display control and thus displays the operation information of the monitoring target device corresponding to the selected abnormality occurrence information in the display device.

A monitoring worker who monitors the monitoring target device, by performing an operation to select one item, or one item among two or more items, of the abnormality occurrence information displayed in the display device, causes the display device to display the image capturing information or the operation information of the monitoring target device corresponding to the time when the abnormality occurred in the monitoring target device, and thus can confirm the apparent circumstances or operational circumstances corresponding to the time when the abnormality occurred in the monitoring target device. Therefore, it is possible to easily confirm under what circumstances and how an abnormality has occurred in a monitoring target device.

BRIEF DESCRIPTION OF THE DRAWINGS

FIG. 7 shows a display state of a first monitor according to a second embodiment.

FIG. 8 shows a state in which abnormality occurrence information of the first monitor according to the second embodiment has been selected.

FIG. 9 shows a state in which abnormality occurrence information of the first monitor according to the second embodiment has been selected.

FIG. 10 shows a state in which abnormality occurrence information of the first monitor according to the second embodiment has been selected.

DESCRIPTION OF THE INVENTION

1. First Embodiment

A first embodiment of an article transport facility provided with a monitoring system will be described with reference to the drawings.

Figure 1:
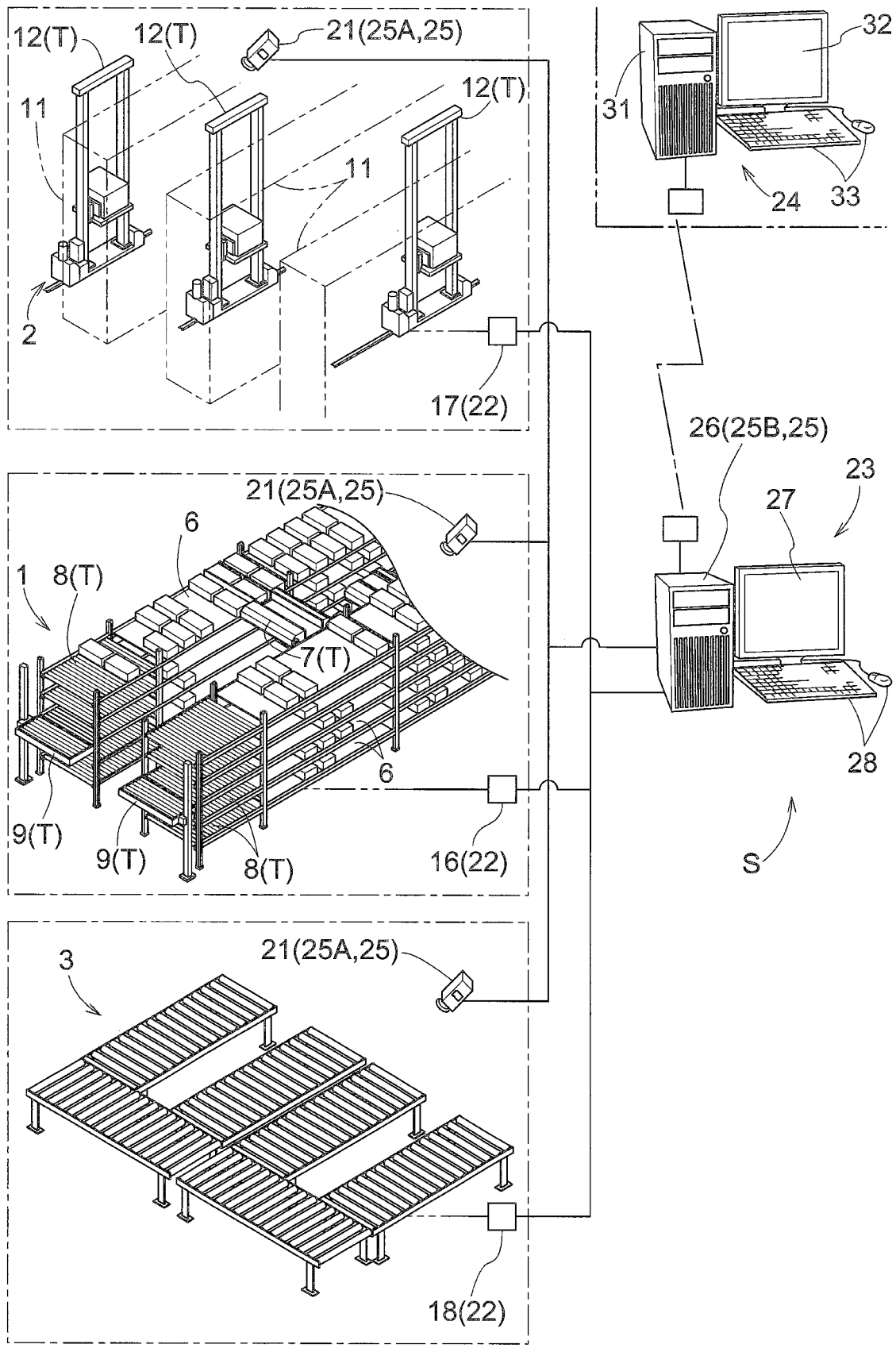
FIG. 1 shows a monitoring system provided in an article transport facility according to a first embodiment.

As shown in FIG. 1, the article transport facility includes a first automatic warehouse 1 and a second automatic warehouse 2 that store articles, and a transport conveyor 3 that transports the articles. In the present embodiment, the article transport facility is installed over a plurality of floors of a building, and as an example, is installed over the first to fourth floors of the building.

First Automatic Warehouse

Figure 2:
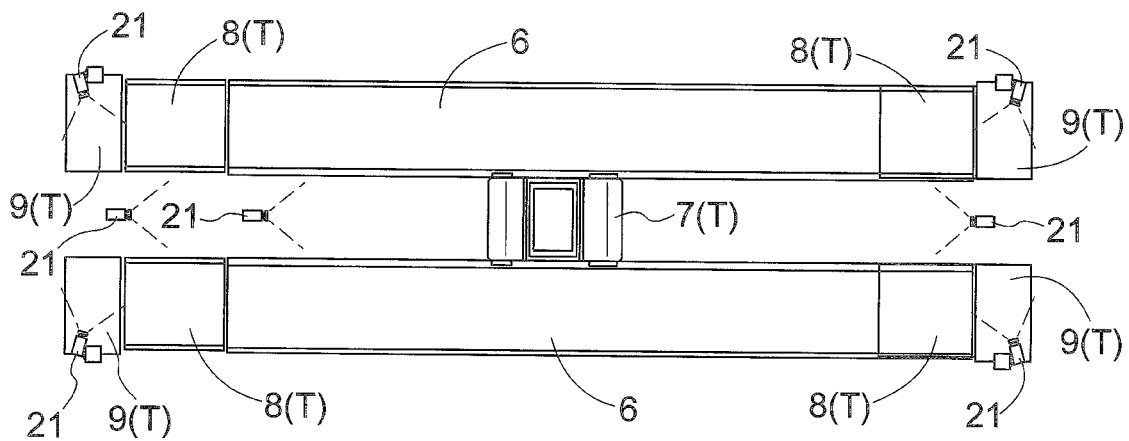
FIG. 2 is a plan view showing a state in which image capturing devices are installed in a first automatic warehouse in the first embodiment.
Figure 3:
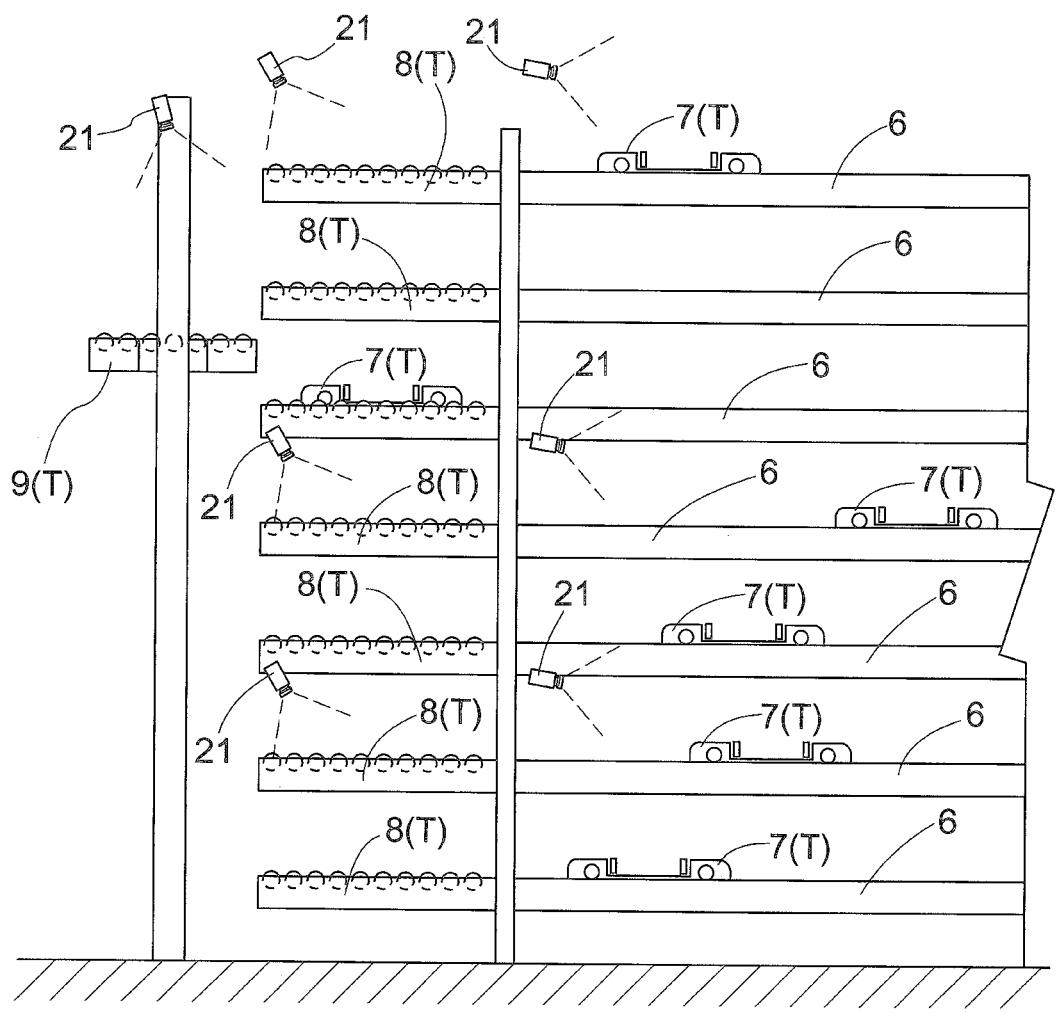
FIG. 3 is a side view showing a state in which the image capturing devices are installed in the first automatic warehouse in the first embodiment.

As shown in FIGS. 1 to 3, the first automatic warehouse 1 includes first storage shelves 6 that store articles, transport trolleys 7 that transport articles, relay conveyors 8, and lift devices 9. Pairs of the first storage shelves 6 are provided with a space therebetween, and each of the first storage shelves 6 is provided with a plurality of shelves 10 arranged in a vertical direction. The first storage shelves 6 store articles in a state supporting the articles on the shelves 10. The transport trolleys 7 travel along the first storage shelves 6 between the pairs of first storage shelves 6, thereby transporting the articles.

Provided as the relay conveyors 8 are storage relay conveyors 8 used when storing articles in the first storage shelves 6, and delivery relay conveyors 8 used when delivering articles from the first storage shelves 6. A plurality of sets of pairs of these relay conveyors 8 are provided in a state arranged vertically corresponding to the number of levels of the shelves 10 in the first storage shelves 6. Provided as the lift devices 9 are storage lift devices 9 and delivery lift devices 9. Each pair of the lift devices 9 is provided with a conveyor. The storage lift devices 9 are configured to be capable of receiving an article from the transport conveyor 3 adjacent to the first automatic warehouse 1, and delivering the article to the transport conveyor 3. The delivery lift devices 9 are configured to be capable of receiving an article from the delivery relay conveyors 8, and delivering the article to the transport conveyor 3. Note that, as shown in FIG. 2, the plurality of sets of relay conveyors 8 and pairs of the lift devices 9 are each installed on both sides of the first storage shelves 6 in the longitudinal direction of the first storage shelves 6.

The first automatic warehouse 1 transports articles stored in the first storage shelves 6 to the transport conveyor 3 by the transport trolleys 7, the relay conveyors 8, and the lift devices 9 to deliver the articles from the first automatic warehouse 1. Also, the first automatic warehouse 1 transports articles received from the transport conveyor 3 to the first storage shelves 6 by the lift devices 9, the relay conveyors 8, and the transport trolleys 7 to store the articles in the first automatic warehouse 1.

Although not shown, each of the plurality of transport trolleys 7 is provided with a transfer device that transfers articles between the first storage shelves 6 and itself. Each of the plurality of transport trolleys 7 is provided with a travel motor for traveling along a traveling route, a travel sensor for detecting a position in the traveling route, a transfer motor for driving a trolley transfer device, a transfer sensor that detects the state of the trolley transfer device, and a presence/absence sensor that detects the presence/absence of an article in the trolley transfer device. Thus, the transport trolley 7 is provided with devices that operate when information is input from the outside (the transfer device, the travel motor, and the transfer motor), and devices that output information to the outside (the travel sensor, the transfer sensor, and the presence/absence sensor).

The relay conveyors 8 and the lift devices 9 are also provided with devices that operate when information is input from the outside, and devices that operate when information is input from the outside.

Second Automatic Warehouse and Transport Conveyor

The second automatic warehouse 2 is provided with second storage shelves 11 that store articles, and stacker cranes 12 that transport the articles. The stacker cranes 12 is provided with a transfer device that transfers articles between itself and the second storage shelves 11. The transport conveyor 3 is installed in a state adjacent to the second automatic warehouse 2. The second automatic warehouse 2 transports articles stored in the second storage shelves 11 to the transport conveyor 3 by the stacker cranes 12 to deliver the articles from the second automatic warehouse 2. Also, the second automatic warehouse 2 transports articles received from the transport conveyor 3 to the second storage shelves 11 by the stacker cranes 12 to store the articles in the second automatic warehouse 2. The stacker cranes 12 are provided with devices that operate when information is input from the outside, and devices that operate when information is input from the outside.

The transport conveyor 3 is also provided with devices that operate when information is input from the outside, and devices that operate when information is input from the outside.

Control Configuration

The article transport facility includes a first control device 16 that controls the first automatic warehouse 1, a second control device 17 that controls the second automatic warehouse 2, and a third control device 18 that controls the transport conveyor 3.

The first control device 16 is configured to be able to transmit and receive information to and from the transport trolleys 7, the relay conveyors 8 and the lift devices 9 in the first automatic warehouse 1. The first control device 16 controls the transport trolleys 7, the relay conveyors 8 and the lift devices 9 by transmitting control information to devices provided in each of the transport trolleys 7, the relay conveyors 8 and the lift devices 9. The devices provided in the transport trolleys 7, the relay conveyors 8, and the lift devices 9 transmit operation information to the first control device 16, and the first control device 16 transmits this operation information to a first monitoring device 23 together with time information indicating the time at which the operation information was obtained. The "time when the operation information was obtained" is a reference time at which the operation information is acquired. For example, this time can be a time when an output device 22 transmitted the operation information to a first computer 26, or a time when the first computer 26 received the operation information from the output device 22, or a time when a monitoring target device T actually operated, or the like.

The second control device 17 is configured to be able to transmit and receive information to and from the stacker cranes 12 of the second automatic warehouse 2. The second control device 17 controls the stacker cranes 12 by transmitting control information to devices provided in the stacker cranes 12. The devices provided in the stacker cranes 12 transmit operation information to the second control device 17, and the second control device 17 transmits this operation information together with time information indicating the time at which the operation information was obtained to the first monitoring device 23.

The third control device 18 is configured to be able to transmit and receive information to and from the transport conveyor 3. The third control device 18 controls the transport conveyor 3 by transmitting operation information to devices provided in the transport conveyor 3. The devices provided in the transport conveyor 3 transmit operation information to the third control device 18, and the third control device 18 transmits this operation information together with time information indicating the time at which the operation information was obtained to the first monitoring device 23.

In the present embodiment, the operation information is information (I/O information) indicating input or output of information to the monitoring target device T. For example, the operation information includes an operation signal input or output to operate each drive unit or drive mechanism of the monitoring target device T, a detection signal output from a sensor provided in each unit, and the like.

Overview of Monitoring System

A monitoring system S includes an image capturing device 21 that captures images of a plurality of monitoring target devices T, the output device 22 that outputs operation information of the plurality of monitoring target devices T, the first monitoring device 23, a second monitoring device 24, and a storage device 25 that stores information. The first monitoring device 23 is installed in the building where the article transport facility is installed. The second monitoring device 24 is installed at a location away from the building where the article transport facility is installed. For example, the first monitoring device 23 is a monitoring device that allows a user using the article transport facility to monitor the article transport facility, and the second monitoring device 24 is a monitoring device that allows a supplier who has delivered the article transport facility to monitor the article transport facility. As described above, the first monitoring device 23 and the second monitoring device 24 may be installed in different locations separated from each other.

The first monitoring device 23 includes a first computer 26, a first monitor 27, and a first operation device 28. The second monitoring device 24 includes a second computer 31, a second monitor 32, and a second operation device 33.

The first operation device 28 and the second operation device 33 are configured by a keyboard and a mouse. The first monitoring device 23 and the second monitoring device 24 are connected by an Internet line, and can transmit and receive various information to and from each other.

Note that each of the first monitor 27 and the second monitor 32 corresponds to a display device that displays information, and each of the first computer 26 and the second computer 31 corresponds to a control device that controls a display device.

Image Capturing Device

As shown in FIG. 1, an image capturing device 21 is provided for each of the first automatic warehouse 1, the second automatic warehouse 2, and the transport conveyor 3.

More specifically, regarding the first automatic warehouse 1, the transport trolleys 7, the relay conveyors 8, and the lift devices 9 serve as the monitoring target devices T, and an image capturing device 21 is provided for the plurality of transport trolleys 7, the relay conveyors 8, and the lift devices 9. In the present embodiment, as shown in FIGS. 2 and 3, one image capturing device 21 is installed for each of the two pairs of lift devices 9. Also, one image capturing device 21 is installed for two or three of the relay conveyors 8 arranged in the vertical direction, and one image capturing device 21 is installed for two or three of the transport trolleys 7 arranged in the vertical direction. Note that the image capturing devices 21 are installed so as not to move by installing them in a state fixed to a mast that guides the first storage shelves 6 or the lift devices 9 in the vertical direction. However, the image capturing devices 21 may be installed by fixing them to the transport trolleys 7 or the lift devices 9 so as to move integrally with the transport trolleys 7 or the lift devices 9.

Also, although not shown, regarding the second automatic warehouse 2, the stacker cranes 12 serve as the monitoring target devices T, and an image capturing device 21 is provided for the stacker cranes 12 in the second automatic warehouse 2. Also, regarding the transport conveyor 3, a direction change portion that changes the transport direction of transporting the articles in the transport conveyor 3, and a branching/merging portion where the transport path in which articles are transported branches or merge together, serve as the monitoring target devices T, and an image capturing device 21 is provided for the direction change portion and the branching/merging portion in the transport conveyor 3.

Thus, in the present embodiment, the monitoring target devices T are transport devices for transporting articles.

The image capturing device 21 constantly captures an image of the monitoring target device T that is the image capturing target. The image capturing device 21 includes a storage medium such as a flash memory card or a hard disk drive (HDD), and is configured to be able to store information. In the present embodiment, such a storage medium of the image capturing device 21 functions as a first storage unit 25A. The image capturing device 21 stores captured image capturing information and image capturing time information indicating the time at which the image capturing information was captured, associated with each other, in the first storage unit 25A. The image capturing device 21 automatically deletes image capturing information that has passed a storage period.

Also, when the image capturing device 21 receives an abnormality occurrence signal from the first computer 26, the image capturing device 21 reads out, from the first storage unit 25A, image capturing information of a set time period for the time at which the abnormality occurred in the monitoring target device T in which the abnormality has occurred, and transmits this information to the first computer 26. Note that the set time period is shorter than the length of the storage period, and in the present embodiment, the set time period is a time period from 5 minutes before to 1 minute after the time when the abnormality occurred.

Storage Device

The storage device 25 stores, in an associated manner, image capturing information obtained in image capturing of each of the plurality of image capturing devices 21, image capturing time information indicating the time when the image capturing information was captured, and identification information of the monitoring target device T for which the image capturing information was captured. Also, the storage device 25 stores, in an associated manner, the operation information output by each of the plurality of output devices 22, operation time information indicating the time when the operation information was obtained, and identification information of the monitoring target device T related to the operation information.

Here, the storage device 25 includes the first storage unit 25A and a second storage unit 25B. The first storage unit 25A is configured to store the image capturing information (image capturing information that has not exceeded the storage period) of a current to past storage period, with the image capturing information associated with the image capturing time information and the identification information of the monitoring target device T, and is configured to delete image capturing information past the storage period. As described above, in the present embodiment, the first storage unit 25A is provided in the image capturing device 21.

The second storage unit 25B is configured to, when an abnormality has occurred in any of the plurality of monitoring target devices T, store the image capturing information at the time when the abnormality occurred for the monitoring target device T in which the abnormality has occurred, associated with the image capturing time information and identification information of the monitoring target device T, and is configured to not delete the image capturing information even past the storage period of the first storage unit 25A.

The first computer 26 includes a storage medium such as a hard disk drive or a solid state drive (SSD), and is configured to be able to store information. In the present embodiment, such a storage medium of the first computer 26 functions as the second storage unit 25B.

The first computer 26 receives the operation information of the plurality of monitoring target devices T from the first control device 16, the second control device 17, and the third control device 18.

That is, the first control device 16, the second control device 17, and the third control device 18 correspond to the output devices 22 that output operation information of the plurality of monitoring target devices T.

When the first computer 26 receives the information indicating that an abnormality has occurred in the monitoring target device T, the first computer 26 transmits abnormality occurrence information to the image capturing device 21 that performs image capturing of the monitoring target device T in which the abnormality has occurred. The image capturing device 21 that received the abnormality occurrence signal transmits, to the first computer 26, the image capturing information of the set time period for the time in which the abnormality has occurred in the monitoring target device T in which the abnormality has occurred.

Then, when the image capturing information and the image capturing time information has been received from the image capturing device 21, the first computer 26 stores the image capturing information of the time when the abnormality occurred in the monitoring target device T in which the abnormality has occurred, associated with the image capturing time information and identification information of the monitoring target device T. In this configuration, a storage period is not set for the image capturing information transmitted to the first computer 26, and the image capturing information is not deleted even if the storage period set in the first storage unit 25A is passed.

An identification number of the monitoring target device T stored in the first computer 26 can be, for example, a number assigned to the monitoring target device T to be captured by the image capturing device 21, or a number assigned to the image capturing device 21 itself. In a case where an address on a network is assigned to the image capturing device 21, that address may be used as identification information.

Monitor Display

Figure 4:
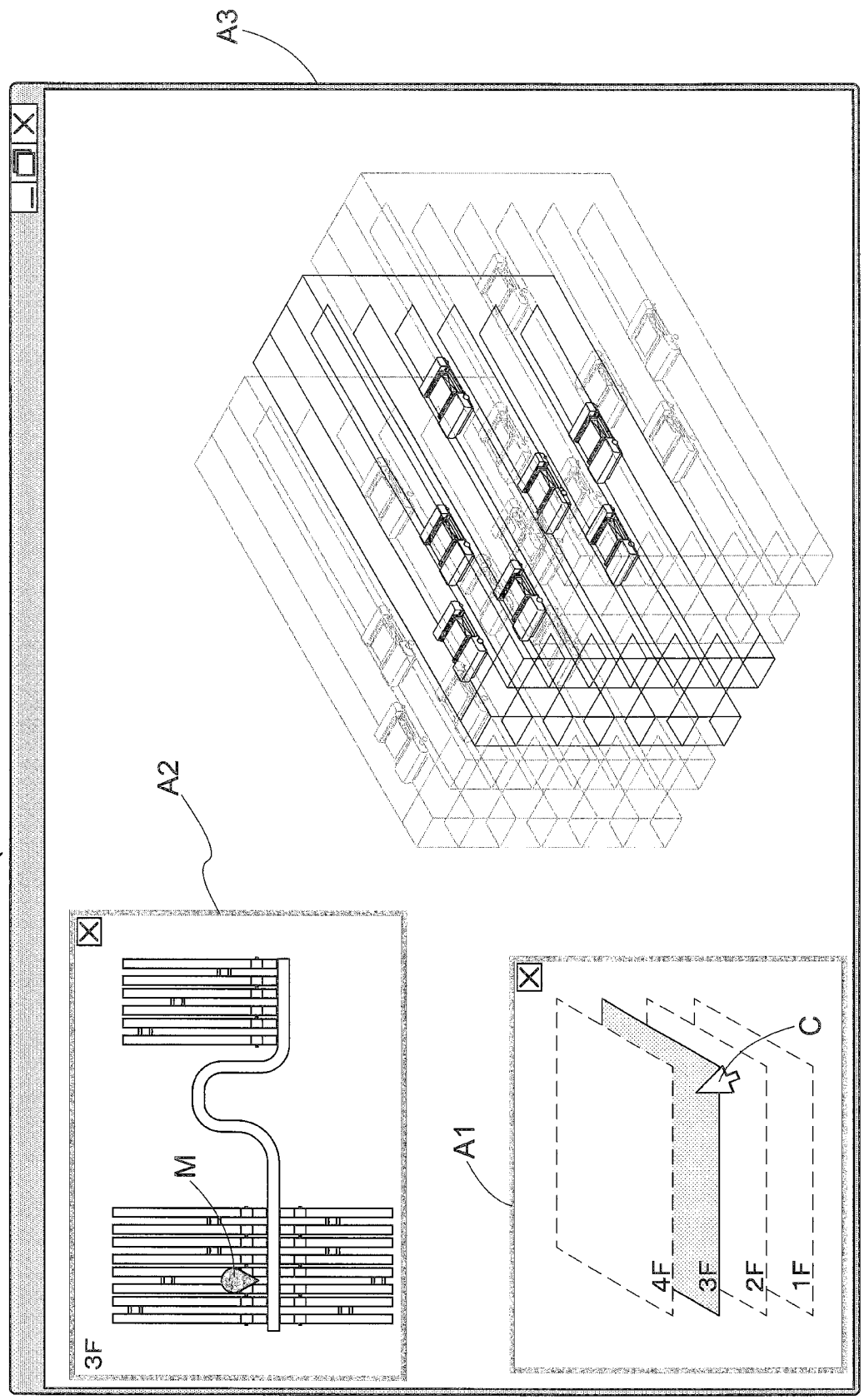
FIG. 4 shows a display state of a first monitor according to the first embodiment.

As shown in FIG. 4, the first computer 26 sets a first area A1 in a display screen of the first monitor 27, and executes a first control that uses the set first area A1 to display entire facility information representing the entire article transport facility on the first monitor 27. By the first computer 26 executing the first control, an image representing the hierarchy of the article transport facility as entire facility information is displayed in the rectangular first area A1.

When one of a plurality of floors is selected in the first area A1, the first computer 26 sets a second area A2 in the display screen of the first monitor 27, and executes a second control that uses the set second area A2 to display floor information representing a selected floor, which is the selected floor of the article transport facility, on the first monitor 27. By the first computer 26 executing the second control, an image representing the selected floor is displayed as the floor information in the rectangular second area A2. FIG. 4 shows a state where a third floor is selected in the first area A1 and an image representing the third floor in the article transport facility is displayed in the second area A2. Also, in the second control, the selected floor in the image representing the hierarchy of the first area A1 is displayed in a mode different from floors other than the selected floor.

Note that a case where one of the plurality of floors has been selected in the first area A1 specifically means a case where, as shown in FIG. 4, a mouse is clicked after a cursor C displayed on the display screen of the first monitor 27 has been moved by the mouse of the first operation device 28 so as to overlap the target floor. Afterward, "when selected" indicates a case where a similar operation is performed by the first operation device 28.

When a part of the facility installed on the selected floor is selected in the second area A2, the first computer 26 sets a rectangular third area A3 in the display screen of the first monitor 27, and executes a third control that uses the set third area A3 to display selection information representing a selected facility portion on the first monitor 27. By the first computer 26 executing the third control, an image representing the selected facility portion is displayed in the third area A3. FIG. 4 shows a state where the first automatic warehouse 1 is selected in the second area A2 and an image representing the first automatic warehouse 1 is displayed in the third area A3. Also, in the third control, a mark M indicating that the facility portion has been selected is displayed at a position corresponding to the selected facility portion in the image representing the hierarchy of the second area A2.

Figure 5:
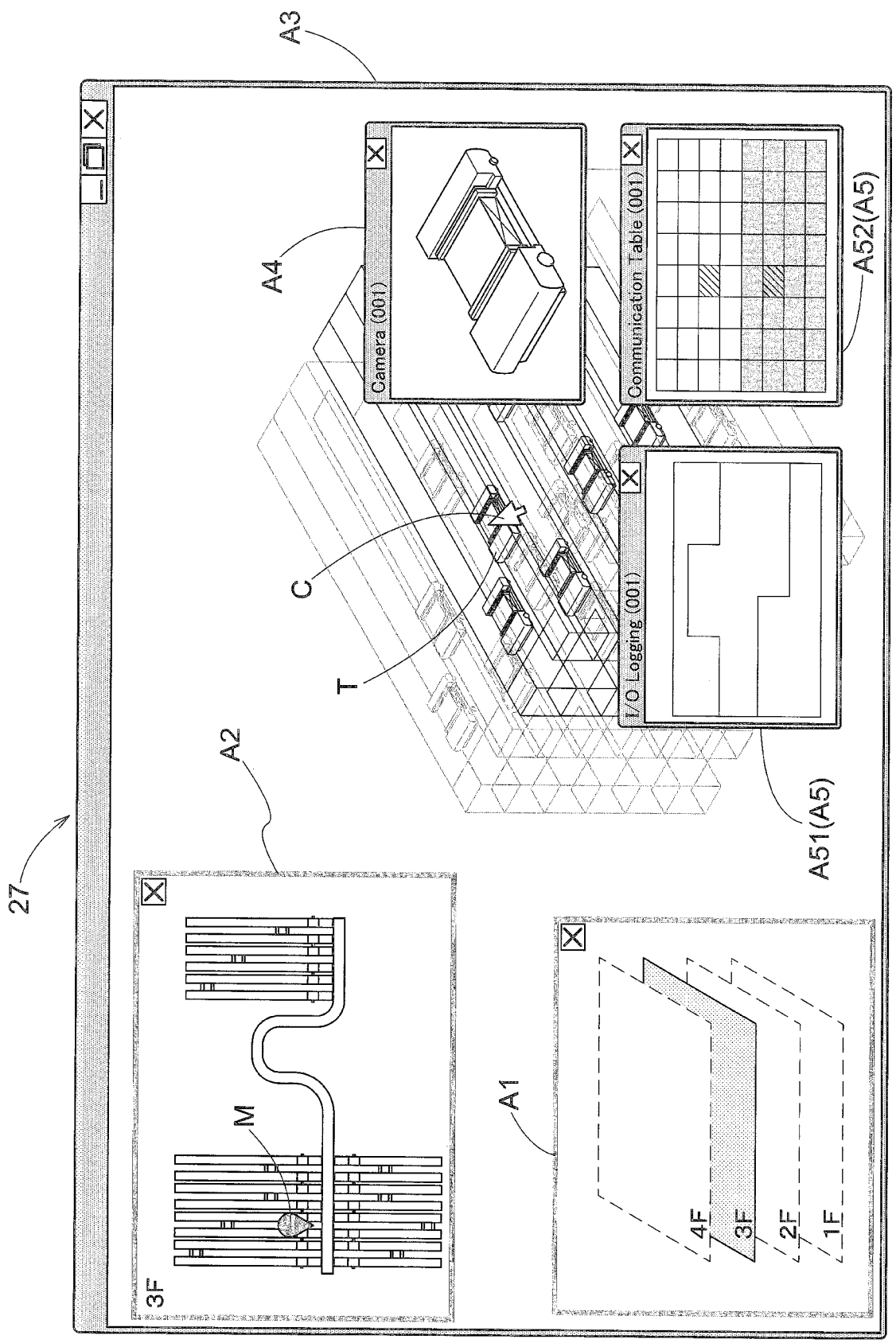
FIG. 5 shows a state in which a monitoring target device of the first monitor according to the first embodiment has been selected.

As shown in FIG. 5, when a monitoring target device T is selected in the third area A3, the first computer 26 sets a fourth area A4 and a fifth area A5 in the display screen of the first monitor 27, and executes a fourth control that uses the set fourth area A4 to display the current image capturing information of the image capturing device 21 that performs image capturing of the selected monitoring target device T, and executes a fifth control that uses the set fifth area A5 to display the current operation information of the selected monitoring target device T.

By the first computer 26 executing the fourth control, a moving image of the monitoring target device T captured by the image capturing device 21 is displayed in real time in the rectangular fourth area A4. Also, by the first computer 26 executing the fifth control, the operation information is displayed in each of two fifth areas A5. In a first display fifth area A51, which is one of the two fifth areas A5, the current operation information of the selected monitoring target device T is displayed in a graph. In a second display fifth area A52, which is the other of the two fifth areas A5, matrix-like cells are displayed, and the display mode of a cell corresponding to the selected monitoring target device T is changed according to input/output of current data.

Note that the third area A3 corresponds to a device selection area for receiving selection of one of the plurality of monitoring target devices T, and the third control corresponds to a fourth display control that displays device layout information representing an actual layout state of the plurality of monitoring target devices T.

Figure 6:
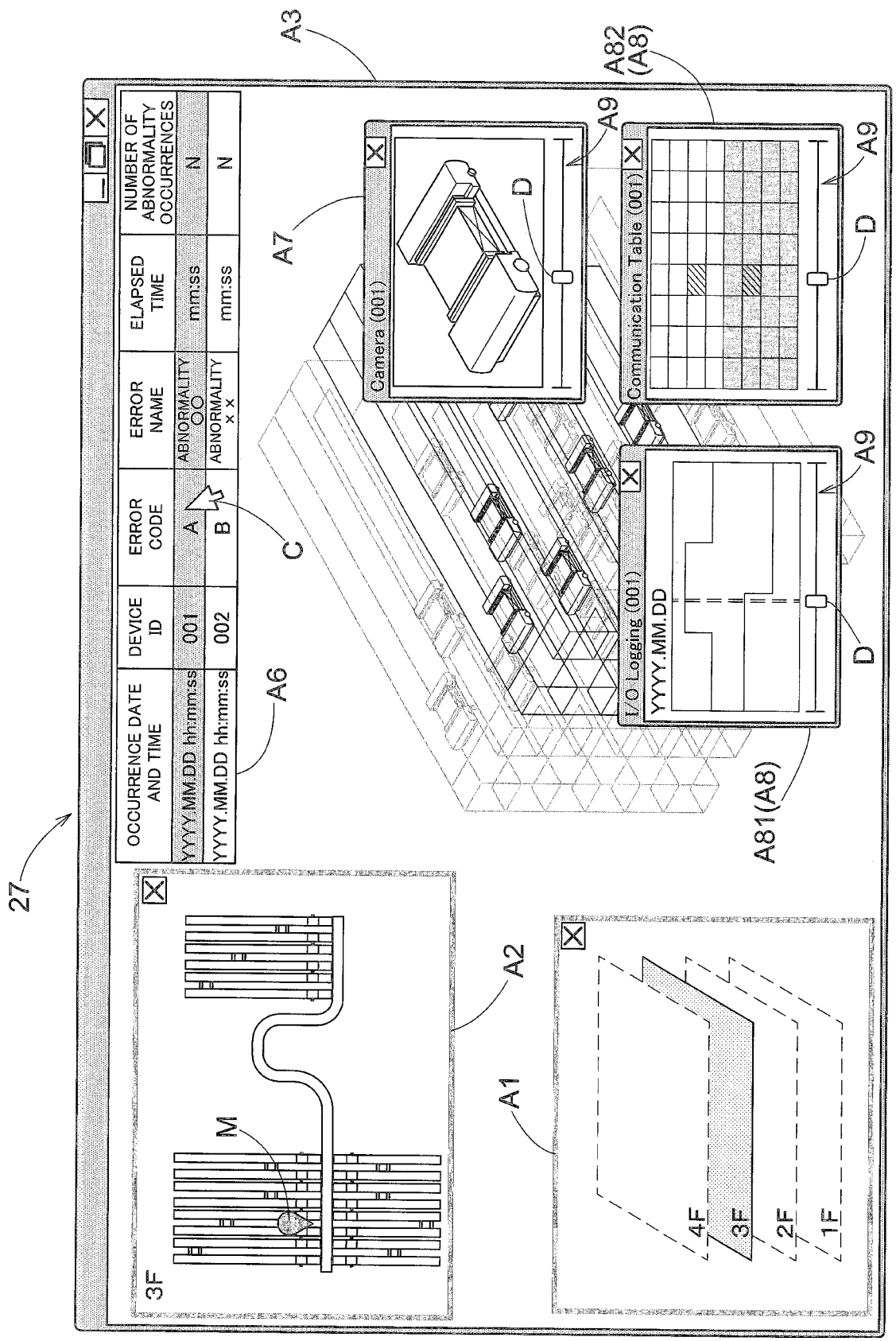
FIG. 6 shows a state in which abnormality occurrence information of the first monitor according to the first embodiment has been selected.

As shown in FIG. 6, when an abnormality has occurred in any of the plurality of monitoring target devices T, the first computer 26 sets a sixth area A6 on the display screen of the first monitor 27, and executes a sixth control that uses the set sixth area A6 to display, on the first monitor 27, abnormality occurrence information including identification information of the monitoring target device T in which the abnormality has occurred and occurrence time information indicating the time when the abnormality occurred. In this configuration, by the first computer 26 executing the sixth control, in the rectangular sixth area A6, a table is displayed in which identification information of the monitoring target device T in which the abnormality has occurred and occurrence time information indicating the time when the abnormality occurred are associated, and a character string indicating display content of each item to be displayed in this table is displayed.

In the table of the sixth area A6, in the item row, there are items of "occurrence date and time", "device ID", "Error-Code", "Error name", "elapsed time", and "number of abnormality occurrences", and information corresponding to the column of each item is displayed in a character string. Thus, in the sixth area A6, the same type of information is displayed in each column, and the identification information of the monitoring target device T in which the abnormality has occurred and the occurrence time information indicating the time when the abnormality occurred are displayed in a list.

Note that a character string indicating occurrence time information is displayed in the column of the item "occurrence date and time". In the column of the item of "device ID", a character string indicating device identification information is displayed. In the column of the item "ErrorCode", an identification code such as a character string assigned according to the type of abnormality is displayed. In the column of the item "Error name", a character string indicating the type of abnormality is displayed. In the column of the item "elapsed time", a time elapsed since the occurrence of the abnormality is displayed as a character string. In the column of the item "number of abnormality occurrences", the number of times that the corresponding type of abnormality has occurred in the corresponding device is displayed.

Incidentally, the column selected as the abnormality occurrence information in the sixth area A6 is displayed in a mode different from the other columns. Also, among the plurality of monitoring target devices T displayed in the third area A3, the monitoring target device T corresponding to the column selected as the abnormality occurrence information in the sixth area A6 is displayed in a mode different from the other monitoring target devices T. Note that the sixth control corresponds to a first display control, and the sixth area A6 corresponds to an abnormality display area.

When one item, or one item among two or more items, of the abnormality occurrence information displayed in the sixth area A6 has been selected, the first computer 26 sets a seventh area A7 on the display screen of the first monitor 27, and executes a seventh control that acquires the image capturing information of the monitoring target device T corresponding to the selected abnormality occurrence information from the second storage unit 25B of the storage device 25, and uses the set seventh area A7 to display the acquired image capturing information on the first monitor 27. Also, the first computer 26 sets an eighth area A8 on the display screen of the first monitor 27, and executes an eighth control that acquires the operation information of the monitoring target device T corresponding to the selected abnormality occurrence information from the second storage unit 25B of the storage device 25, and uses the set eighth area A8 to display the acquired operation information on the first monitor 27.

By the first computer 26 executing the seventh control, a moving image of the set time period including the time when the abnormality related to the selected abnormality occurrence information has occurred is displayed as the image capturing information in the rectangular seventh area A7. Also, by the first computer 26 executing the eighth control, in each of the two eighth areas A8, information indicating a change in the operation information of the monitoring target device T in the set time period including the time when an abnormality related to the selected abnormality occurrence information, is displayed. In a first display eighth area A81, which is one of the two eighth areas A8, information indicating a change in the operation information of the monitoring target device T in the set time period related to the selected abnormality occurrence information is displayed in a graph. In a second display eighth area A82, which is the other of the two eighth areas A8, matrix-like cells are displayed. One cell is assigned to one device that acquires the operation information provided in the monitoring target device T, and in the second display eighth area A82, display is performed such that the display mode of cells corresponding to each device provided in the target monitoring target device T is changed according to the information indicating the change of the operation information of the monitoring target device T.

The sixth area A6, the seventh area A7, and the eighth area A8 are simultaneously displayed on the display screen of the first monitor 27, and the abnormality occurrence information, the image capturing information, and the operation information are simultaneously displayed.

Note that the seventh control corresponds to a second display control, and the seventh area A7 corresponds to an image capturing display area. Also, the eighth control corresponds to a third display control, and the eighth area A8 corresponds to an operation information area.

Also, when one item, or one item among two or more items, of the abnormality occurrence information displayed in the sixth area A6 has been selected, the first computer 26 sets a ninth area A9 on the display screen of the first monitor 27, and executes a ninth control that displays a specification portion D for specifying a specified time in the ninth area A9. Thus, when one item, or one item among two or more items, of the abnormality occurrence information displayed in the sixth area A6 has been selected, the first computer 26 displays the ninth area A9 including the specification portion D on the display screen of the first monitor 27. In the present embodiment, the ninth area A9 is displayed at a position corresponding to each of the seventh area A7 and the two eighth areas A8, specifically, in a state adjacent to the lower side of each of the seventh area A7 and the two eighth areas A8. Note that the ninth area A9 corresponds to a time specification area.

Also, in the ninth control, when a time specification has been received in the ninth area A9, the first computer 26 displays a moving image that starts from a specified time in the seventh area A7, and displays information indicating a change in the operation state of the monitoring target device T that starts from the specified time in the eighth area A8. That is, respective ninth areas A9 are displayed below the seventh area A7 and the two eighth areas A8, and when a time specification has been received by sliding operation in the left-right direction of the specification portion D in one of those ninth areas A9, the moving image displayed in the seventh area A7 and the operation state displayed in the two eighth areas A8 are displayed in a synchronized state from the state at the designated time. Specifically, regarding the seventh area A7, a moving image that starts from the specified time is played, regarding the first display eighth area A81, the cursor position on the graph is moved from the position corresponding to the specified time, and regarding the second display eighth area A82, its display is changed from the display state of the cell at the specified time.

In the present embodiment, the first area A1, the second area A2, the fourth area A4, the fifth area A5, the sixth area A6, the seventh area A7, and the eighth area A8 are formed at predetermined positions in the third area A3. However, a configuration may also be adopted in which the first area A1, the second area A2, the fourth area A4, the fifth area A5, the sixth area A6, the seventh area A7, and the eighth area A8 are not formed in a state fixed with respect to the third area A3, such as a configuration in which they are movable relative to the third area A3 by operation of the first operation device 28.

When an abnormality has occurred, the first computer 26 transmits abnormality information to the second computer 31, and when request information has been received from the second computer 31, the first computer 26 transmits image capturing information and operation information to the second computer 31.

The second computer 31 is configured to be capable of executing the first control to the ninth control in the same manner as described above, based on the abnormality information, image capturing information, operation information, and the like transmitted from the first computer 26.

2. Second Embodiment

Next, a second embodiment of the monitoring system will be described with reference to FIGS. 7 to 10.

The present embodiment is different from the first embodiment in that the display mode of the monitor is different. Hereinafter, the monitoring system according to the present embodiment will be described focusing mainly on differences from the above-described first embodiment. Note that points that are not particularly described are the same as in the above-described first embodiment.

As shown in FIG. 7, the first computer 26 executes a control to set a tenth area A10 in the display screen of the first monitor 27, and within the tenth area A10, to set an eleventh area A11 for selecting a display period, a twelfth area A12 for selecting an identification number, and a thirteenth area A13, a fourteenth area A14, a fifteenth area A15, and a sixteenth area A16 for performing an operation of displaying information according to the selected display period and the identification number. Here, this control is referred to as a tenth control. In the twelfth area A12, in addition to selecting a device ID indicating the device identification number, "ALL" indicating all the identification numbers can be selected. In FIG. 7, "ALL" is selected in the twelfth area A12.

A first display sixteenth area A161 and a second display sixteenth area A162 are set as the sixteenth area A16. A character string "I/O" is displayed in the first display sixteenth area A161, and a character string "C-BOX" is displayed in the second display sixteenth area A162. Also, a character string "SHOW" is displayed in the thirteenth area A13, and a character string "Camera" is displayed in the fifteenth area A15. Note that the fifteenth area A15 corresponds to a first selection area, and the sixteenth area A16 corresponds to a second selection area.

Due to performance of an operation of selecting the thirteenth area A13 after the display period is selected in the eleventh area A11 and the identification number is selected in the twelfth area A12, the first computer 26 executes a fourteenth control of displaying, in the fourteenth area A14, the abnormality occurrence information regarding the abnormality that has occurred in the monitoring target device T of the selected identification number in the selected display period. Note that the information displayed in the fourteenth area A14 is the same as the information displayed in the sixth area A6 in the first embodiment above.

As described above, when an abnormality has occurred in any of the plurality of monitored devices T, the first computer 26 uses the fourteenth area A14 to display, on the first monitor 27, abnormality occurrence information including identification information of the monitoring target device T in which the abnormality has occurred and occurrence time information indicating the time when the abnormality occurred. Note that the fourteenth control corresponds to a first display control, and the fourteenth area A14 corresponds to an abnormality display area.

Also, when one item of abnormality occurrence information is selected in the fourteenth area A14 and the fifteenth area A15 is selected, the first computer 26 executes a fifteenth control that acquires the image capturing information of the monitoring target device T corresponding to the selected abnormality occurrence information from the second storage unit 25B of the storage device 25, and displays the acquired image capturing information on the first monitor 27. Also, when one item of abnormality occurrence information is selected in the fourteenth area A14 and the sixteenth area A16 is selected, the first computer 26 executes a sixteenth control described later.

By the first computer 26 executing the fifteenth control, as shown in FIG. 10, instead of the eleventh area A11, the twelfth area A12, the thirteenth area A13, the fourteenth area A14, the fifteenth area A15, and the sixteenth area A16, a nineteenth area A19 and a twentieth area A20 are set in the tenth area A10. Then, in the rectangular nineteenth area A19, a moving image of a set time period related to the selected abnormality occurrence information is displayed as image capturing information.

Note that the fifteenth control corresponds to a second display control, and the nineteenth area A19 corresponds to an image capturing display area. The sixteenth control corresponds to a third display control, and the seventeenth area A17 and the eighteenth area A18 correspond to an operation information area.

When the first computer 26 executes the sixteenth control, and the first display sixteenth area A161 is selected as the sixteenth area A16, as shown in FIG. 8, instead of the eleventh area A11, the twelfth area A12, the thirteenth area A13, the fourteenth area A14, the fifteenth area A15, and the sixteenth area A16, the seventeenth area A17 and the twentieth area A20 are set in the tenth area A10. Then, in the rectangular seventeenth area A17, information representing a change in the operation information of the monitoring target device T in the set time period related to the selected abnormality occurrence information is displayed in a graph format.

When the first computer 26 executes the sixteenth control, and the first display sixteenth area A161 is selected as the sixteenth area A16, as shown in FIG. 9, instead of the eleventh area A11, the twelfth area A12, the thirteenth area A13, the fourteenth area A14, the fifteenth area A15, and the sixteenth area A16, the eighteenth area A18 and the twentieth area A20 are set in the tenth area A10. Then, matrix-like cells are displayed in the rectangular eighteenth area A18. One cell is assigned to one device that acquires the operation information provided in the monitoring target device T, and in the second display eighth area A82, display is performed such that the display mode of cells corresponding to each device provided in the target monitoring target device T is changed according to the information indicating the change of the operation information of the monitoring target device T.

The seventeenth area A17, the eighteenth area A18, and the nineteenth area A19 are displayed by switching the display content of the same tenth area A10, so the abnormality occurrence information, the image capturing information, and the operation information are not simultaneously displayed.

3. Other Embodiments

Next, other embodiments of the monitoring system will be described.

(1) In the above embodiments, an example is described in which when a time specification has been received in the time specification area, a moving image that starts from a specified time is displayed in the image capturing information area, and the operation state of the monitoring target device T at the specified time is displayed in synchronization in the operation information area. However, this is not a limitation, and it is also possible to adopt a configuration in which the time specification area is set for both the image capturing information area and the operation information area, and a time specification can be set for each of these individually. For example, a configuration may be adopted in which, when a time specification has been received in the time specification area for the image capturing information area, a moving image that starts from a specified time is displayed in the image capturing information area while maintaining the current display in the operation information area, and when a time specification has been received in the time specification area for the operation information area, the operation state of the monitoring target device T at the specified time is displayed in the operation information area while maintaining the current display in the image capturing information area.

(2) In the above embodiments, the mode of display on the first monitor 27 by the control of the first computer 26 is the same as the mode of display on the first monitor 27 by the control of the second computer 31, but the mode of display on the first monitor 27 by the control of the first computer 26 may be different than the mode of display on the first monitor 27 by the control of the second computer 31. For example, a configuration may be adopted in which information is displayed on the first monitor 27 by the control of the first computer 26 as in the first embodiment, and information is displayed on the second monitor 32 by the control of the second computer 31 as in the second embodiment.

(3) In the above embodiments, a moving image is displayed in the image capturing information area, but a still image may be displayed in the image capturing information area. Also, although the operation information is displayed in a graph or the like in the operation information area, the operation information may be displayed as a character string (including a numerical value) in the operation information area.

(4) In the above embodiments, the monitoring target device T is a transport device for transporting articles, but the specific mode of the monitoring target device T is not limited to this. For example, the monitoring target device T may be a manufacturing device for manufacturing articles, a storage device for storing articles, or the like.

(5) It should be noted that the configurations disclosed in each of the above embodiments can be applied in combination with the configurations disclosed in other embodiments as long as no contradiction arises. Regarding those other configurations as well, the embodiments disclosed in the present specification are merely examples in all respects. Accordingly, various modifications can be made as appropriate in a range that does not depart from the gist of the present disclosure.

4. Summary of the Above Embodiments

Following is a summary of the monitoring system described above.

This monitoring system includes a plurality of image capturing devices that capture images of a plurality of monitoring target devices, output devices that output operation information of the plurality of monitoring target devices, a display device that displays information, a control device that controls the display device, and a storage device that stores information. The storage device stores, in an associated manner, image capturing information obtained in image capturing of each of the plurality of image capturing devices, image capturing time information indicating the time when the image capturing information was captured, and identification information of the monitoring target devices for which the image capturing information was captured, and the storage device also stores, in an associated manner, the operation information output by each of the plurality of output devices, operation time information indicating the time when the operation information was obtained, and identification information of the monitoring target devices related to the operation information. The control device, when an abnormality has occurred in any of the plurality of monitoring target devices, executes a first display control that causes the display device to display abnormality occurrence information including at least identification information of the monitoring target device in which the abnormality has occurred and occurrence time information indicating the time when the abnormality occurred; and the control device, when one item, or one item among two or more items, of the abnormality occurrence information displayed in the display device has been selected, executes a second display control that acquires the image capturing information of the monitoring target device corresponding to the selected abnormality occurrence information from the storage device and causes the display device to display the acquired image capturing information, and executes a third display control that acquires the operation information of the monitoring target device corresponding to the selected abnormality occurrence information from the storage device and causes the display device to display the acquired operation information.

According to this configuration, when an abnormality has occurred in a monitoring target device, the control device executes the first display control and thus the abnormality occurrence information for the monitoring target device in which the abnormality occurred is displayed in the display device. Thus, it is possible to confirm afterward that the abnormality occurred in the monitoring target device. Also, when an operation has been performed to select one item, or one item among two or more items, of the abnormality occurrence information displayed in the display device, the control device executes the second display control and thus displays the image capturing information of the monitoring target device corresponding to the selected abnormality occurrence information in the display device. Also, when an operation has been performed to select one item, or one item among two or more items, of the abnormality occurrence information displayed in the display device, the control device executes the third display control and thus displays the operation information of the monitoring target device corresponding to the selected abnormality occurrence information in the display device.

A monitoring worker who monitors the monitoring target device, by performing an operation to select one item, or one item among two or more items, of the abnormality occurrence information displayed in the display device, causes the display device to display the image capturing information or the operation information of the monitoring target device corresponding to the time when the abnormality occurred in the monitoring target device, and thus can confirm the apparent circumstances or operational circumstances corresponding to the time when the abnormality occurred in the monitoring target device. Therefore, it is possible to easily confirm under what circumstances and how an abnormality has occurred in a monitoring target device.

Here, it is suitable to adopt a configuration in which the control device sets an image capturing display area and an operation information area in a display screen of the display device, executes the second display control using the image capturing display area, and executes the third display control using the operation information area.

According to this configuration, the image capturing information of the monitoring target device corresponding to the selected abnormality occurrence information is displayed in the image capturing display area of the display device, and the operation information of the monitoring target device corresponding to the selected abnormality occurrence information is displayed in the operation information area of the display device.

By referring to the image capturing display area and the operation information area in the display screen of the display device, the monitoring worker can simultaneously confirm the image capturing information and the operation information of the monitoring target device in which the abnormality has occurred. Therefore, it is possible to more easily confirm under what circumstances and how an abnormality has occurred in a monitoring target device.

Also, it is suitable to adopt a configuration in which the control device, in addition to the image capturing display area and the operation information area, sets an abnormality display area in a display screen of the display device, and executes the first display control using the abnormality display area.

According to this configuration, by referring to the image capturing display area, the operation information area, and the abnormality display area in the display screen of the display device, in addition to the image capturing information and the operation information of the monitoring target device in which the abnormality has occurred, the monitoring worker can simultaneously confirm the identification information of the monitoring target device in which the abnormality has occurred and the occurrence time information indicating the time when the abnormality occurred. Therefore, it is possible to more easily confirm under what circumstances and how an abnormality has occurred in a monitoring target device.

Also, it is suitable to adopt a configuration in which the control device, in addition to the image capturing display area and the operation information area, sets a device layout information area in a display screen of the display device, and using the device layout information area, executes a fourth display control that causes the display device to display device layout information representing an actual layout state of the plurality of monitoring target devices.

According to this configuration, device layout information is displayed in a device layout information area in a display screen of the display device, and by referring to this device layout information, it is possible to understand the actual layout state of the plurality of monitoring target devices. Therefore, it is easy to understand where the monitoring target device in which the abnormality has occurred is located in an article transport facility, and so it is easy to respond to the monitoring target device in which the abnormality has occurred.

Also, it is suitable to adopt a configuration in which the second display control is a control that displays a moving image of a set time period including the time at which the abnormality according to the selected abnormality occurrence information occurred as the image capturing information, and the third display control is a control that displays information indicating a change in the operation state of the monitoring target device in the set time period including the time at which the abnormality according to the selected abnormality occurrence information occurred as the operation information.

According to this configuration, in the image capturing display area, a moving image obtained by capturing the monitoring target device in which the abnormality has occurred is displayed, and information indicating a change in the operation state of the monitoring target device in the set time period including the time at which the abnormality occurred is displayed. Therefore, by referring to the moving image and the information indicating a change in the operation state displayed in the image capturing display area of the display device, it is possible to more easily confirm under what circumstances and how an abnormality has occurred in a monitoring target device.

Also, it is suitable to adopt a configuration in which the control device, in addition to the image capturing display area and the operation information area, displays a time specification area for accepting specification of a time within the set time period in a display screen of the display device, and the control device, when a time specification in the time specification area has been received, also displays a moving image that starts from a specified time in the image capturing display area, and displays information indicating a change in the operation state of the monitoring target device that starts from the specified time in the operation information area.

According to this configuration, when a time specification has been received in the time specification area, a moving image that starts from a specified time is displayed in the image capturing display area, and a change in the operation state that starts from the specified time is displayed in the operation information area, so the moving image displayed in the image capturing display area and the change of the operation state displayed in the operation information area can be displayed in a synchronized state. Therefore, by referring to these items of information, a monitoring worker can more easily confirm under what circumstances and how an abnormality has occurred in a monitoring target device.

Also, it is suitable to adopt a configuration in which the control device displays a device specification area for accepting selection of one among the plurality of monitoring target devices in a display screen of the display device, and when the monitoring target device has been selected, displays current image capturing information of the image capturing device to perform image capturing of the selected monitoring target device in the display device, and displays current operation information of the selected monitoring target device in the display device.

According to this configuration, by selecting one among the plurality of monitoring target devices in a device specification area displayed in a display screen of the display device, image capturing information obtained by capturing the selected monitoring target device and current operation information of the selected monitoring target device are displayed in a display screen of the display device. Therefore, by referring to a display screen of the display device, it is possible to understand the current status of any monitoring target device.

Also, it is suitable to adopt a configuration in which the control device, in a display screen of the display device, sets an abnormality display area, a first selection area, and a second selection area, and when one item of the abnormality occurrence information has been selected in the abnormality display area and the first selection area has been selected, the control device executes the second display control, and when one item of the abnormality occurrence information has been selected in the abnormality display area and the second selection area has been selected, the control device executes the third display control.

According to this configuration, when one item of the abnormality occurrence information and the first selection area has been selected, image capturing information of the monitoring target device corresponding to that abnormality occurrence information is displayed in the display device, and when one item of the abnormality occurrence information and the second selection area has been selected, operation information of the monitoring target device corresponding to that abnormality occurrence information is displayed in the display device. Thus, because it is possible to select whether to display image capturing information of the monitoring target device or to display operation information, it is possible to display information sought by a monitoring worker in the display device.

Also, it is suitable to adopt a configuration in which the storage device is provided with a first storage unit and a second storage unit, the image capturing information can be transmitted from the first storage unit to the second storage unit, the first storage unit is configured to store the image capturing information of a current to past storage period, with the image capturing information associated with the image capturing time information, and is configured to delete the image capturing information past the storage period, the second storage unit is configured to, when an abnormality has occurred in any of the plurality of monitoring target devices, store the image capturing information at the time when the abnormality occurred for the monitoring target device in which the abnormality has occurred, associated with the image capturing time information and identification information of the monitoring target device, and is configured to not delete the image capturing information even past the storage period, and the control device, in the second display control, acquires the image capturing information of the monitoring target device corresponding to the selected abnormality occurrence information from the second storage unit.

According to this configuration, the first storage unit deletes the image capturing information past the storage period, so the amount of image capturing information stored in the first storage unit can be suppressed. Also, image capturing information at the time when the abnormality occurred for the monitoring target device in which the abnormality has occurred is stored in the second storage unit, associated with the image capturing time information and identification information of the monitoring target device. In the second storage unit, it is not necessary to store image capturing information other than the image capturing information at the time when the abnormality occurred, so the amount of image capturing information stored in the second storage unit can be suppressed.

Also, the image capturing information at the time when the abnormality occurred that is stored in the second storage unit is not deleted due to passing the storage period as in the case of the first storage unit, and the control device acquires the image capturing information from the second storage unit in the second display control, so even after the storage period of the image capturing information in the first storage unit has passed, it is possible to execute the second display control with the control device.

Also, it is suitable to adopt a configuration in which the monitoring target device is a transport device for transporting an article.

According to this configuration, it is easy to confirm under what circumstances and how an abnormality has occurred in a transport device.

INDUSTRIAL APPLICABILITY

The technology according to the present disclosure is applicable to a monitoring system provided with a plurality of image capturing devices that capture images of a plurality of monitoring target devices, and an output device that outputs operation information of the plurality of monitoring target devices.

DESCRIPTION OF REFERENCE SIGNS

21: image capturing device
22: output device

25: storage device
25A: first storage unit
25B: second storage unit
27: first monitor (display device)
32: second monitor (display device)
A3: third area (device selection area)
A6: sixth area (abnormality display area)
A7: seventh area (image capturing display area)
A8: eighth area (operation information area)
A9: ninth area (time specification area)
A14: fourteenth area (abnormality display area)
A15: fifteenth area (first selection area)
A16: sixteenth area (second selection area)
A17: seventeenth area (operation information area)
A18: eighteenth area (operation information area)
A19: nineteenth area (image capturing display area)
A20: twentieth area (time specification area)
T: monitoring target device

The invention claimed is:

1. A monitoring system, comprising:
a plurality of image capturing devices that capture images of a plurality of monitoring target devices;
output devices that output operation information of the plurality of monitoring target devices;
a display device that displays information;
a control device that controls the display device; and
a storage device that stores information;
wherein the storage device stores, in an associated manner, image capturing information obtained in image capturing of each of the plurality of image capturing devices, image capturing time information indicating the time when the image capturing information was captured, and identification information of the monitoring target devices for which the image capturing information was captured, and the storage device also storing, in an associated manner, the operation information output by each of the plurality of output devices, operation time information indicating the time when the operation information was obtained, and identification information of the monitoring target devices related to the operation information; and
wherein the control device, when an abnormality has occurred in any of the plurality of monitoring target devices, executes a first display control that causes the display device to display abnormality occurrence information including at least identification information of the monitoring target device in which the abnormality has occurred and occurrence time information indicating the time when the abnormality occurred; and
wherein the control device, when one item, or one item among two or more items, of the abnormality occurrence information displayed in the display device has been selected, executes a second display control that acquires the image capturing information of the monitoring target device corresponding to the selected abnormality occurrence information from the storage device and causes the display device to display the acquired image capturing information, and executes a third display control that acquires the operation information of the monitoring target device corresponding to the selected abnormality occurrence information from the storage device and causes the display device to display the acquired operation information.

2. The monitoring system according to claim 1, wherein the control device sets an image capturing display area and an operation information area in a display screen of the display device, executes the second display control using the image capturing display area, and executes the third display control using the operation information area.

3. The monitoring system according to claim 2, wherein the control device, in addition to the image capturing display area and the operation information area, sets an abnormality display area in a display screen of the display device, and executes the first display control using the abnormality display area.

4. The monitoring system according to claim 2, wherein the control device, in addition to the image capturing display area and the operation information area, sets a device layout information area in a display screen of the display device, and using the device layout information area, executes a fourth display control that causes the display device to display device layout information representing an actual layout state of the plurality of monitoring target devices.

5. The monitoring system according to claim 2, wherein the second display control is a control that displays a moving image of a set time period including the time at which the abnormality according to the selected abnormality occurrence information occurred as the image capturing information, and
wherein the third display control is a control that displays information indicating a change in an operation state of the monitoring target device in the set time period including the time at which the abnormality according to the selected abnormality occurrence information occurred as the operation information.

6. The monitoring system according to claim 5, wherein the control device, in addition to the image capturing display area and the operation information area, displays a time specification area for accepting specification of a time within the set time period in a display screen of the display device, and
wherein the control device, when a time specification in the time specification area has been received, also displays a moving image that starts from a specified time in the image capturing display area, and displays information indicating a change in the operation state of the monitoring target device that starts from the specified time in the operation information area.

7. The monitoring system according to claim 1, wherein the control device displays a device specification area for accepting selection of one among the plurality of monitoring target devices in a display screen of the display device, and
wherein when the monitoring target device has been selected, displays current image capturing information of the image capturing device to perform image capturing of the selected monitoring target device in the display device, and displays current operation information of the selected monitoring target device in the display device.

8. The monitoring system according to claim 1, wherein the control device, in a display screen of the display device, sets an abnormality display area, a first selection area, and a second selection area, and when one item of the abnormality occurrence information has been selected in the abnormality display area and the first selection area has been selected, the control device executes the second display control, and when one item of the abnormality occurrence information has been selected in the abnormality display area and the second selection area has been selected, the control device executes the third display control.

9. The monitoring system according to claim 1, wherein:
the storage device is provided with a first storage unit and a second storage unit, the image capturing information can be transmitted from the first storage unit to the second storage unit, the first storage unit is configured to store the image capturing information of a current to past storage period, with the image capturing information associated with the image capturing time information, and is configured to delete the image capturing information past the storage period, the second storage unit is configured to, when an abnormality has occurred in any of the plurality of monitoring target devices, store the image capturing information at the time when the abnormality occurred for the monitoring target device in which the abnormality has occurred, associated with the image capturing time information and identification information of the monitoring target device, and is configured to not delete the image capturing information past the storage period, and the control device, in the second display control, acquires the image capturing information of the monitoring target device corresponding to the selected abnormality occurrence information from the second storage unit.

10. The monitoring system according to claim 1, wherein the monitoring target device is a transport device for transporting an article.

* * * * *